United States Patent
Bechtel et al.

(10) Patent No.: US 12,522,034 B2
(45) Date of Patent: Jan. 13, 2026

(54) SELF SPOTTING TRAILER REVERSE SYSTEM

(71) Applicant: FCA US LLC, Auburn Hills, MI (US)

(72) Inventors: Travis D Bechtel, Goodrich, MI (US); Mark E Stout, II, Auburn Hills, MI (US); Luca Ferraro, Modena (IT)

(73) Assignee: FCA US LLC, Auburn Hills, MI (US)

( * ) Notice: Subject to any disclaimer, the term of this patent is extended or adjusted under 35 U.S.C. 154(b) by 190 days.

(21) Appl. No.: 18/485,391

(22) Filed: Oct. 12, 2023

(65) Prior Publication Data

US 2024/0149791 A1 May 9, 2024

Related U.S. Application Data

(60) Provisional application No. 63/423,218, filed on Nov. 7, 2022.

(51) Int. Cl.
*B60D 1/24* (2006.01)
*B60D 1/145* (2006.01)
*B62D 15/02* (2006.01)

(52) U.S. Cl.
CPC ............ *B60D 1/249* (2013.01); *B60D 1/145* (2013.01); *B62D 15/021* (2013.01); *B60L 2200/28* (2013.01); *B60W 2300/14* (2013.01)

(58) Field of Classification Search
None
See application file for complete search history.

(56) References Cited

U.S. PATENT DOCUMENTS

| | | | | |
|---|---|---|---|---|
| 10,242,272 | B2* | 3/2019 | Spampinato | G06V 40/20 |
| 2018/0165814 | A1* | 6/2018 | Gulati | G06T 7/001 |
| 2019/0071088 | A1* | 3/2019 | Hu | B60K 35/10 |
| 2020/0023696 | A1* | 1/2020 | Ling | B60R 1/26 |
| 2021/0094473 | A1* | 4/2021 | Gali | B60R 1/26 |
| 2022/0126714 | A1 | 4/2022 | Bucknor et al. | |
| 2023/0311873 | A1* | 10/2023 | Bolf | B60D 1/62 |
| | | | | 701/23 |

* cited by examiner

*Primary Examiner* — Eileen M Adams
(74) *Attorney, Agent, or Firm* — Jeremy J. Klobucar

(57) ABSTRACT

A human machine interface (HMI) system for a multi-vehicle system having a lead vehicle and a trailer vehicle with independent propulsion and control includes a display disposed in the lead vehicle, a lead vehicle sensor suite, a trailer vehicle sensor suite, and a controller configured to generate a trailer reverse screen on the display. The trailer reverse screen includes (i) a trailer rear view showing a view from one or more cameras located on a rear of the trailer vehicle, (ii) a multi-vehicle system top view showing a view from above the multi-vehicle system based on signals from one or more cameras located on the multi-vehicle system, and (iii) a lead vehicle backup camera view from a lead vehicle backup camera, to thereby provide a driver of the lead vehicle with an intuitive perspective for reversing the trailer vehicle without aid from another person outside of the lead vehicle.

20 Claims, 10 Drawing Sheets

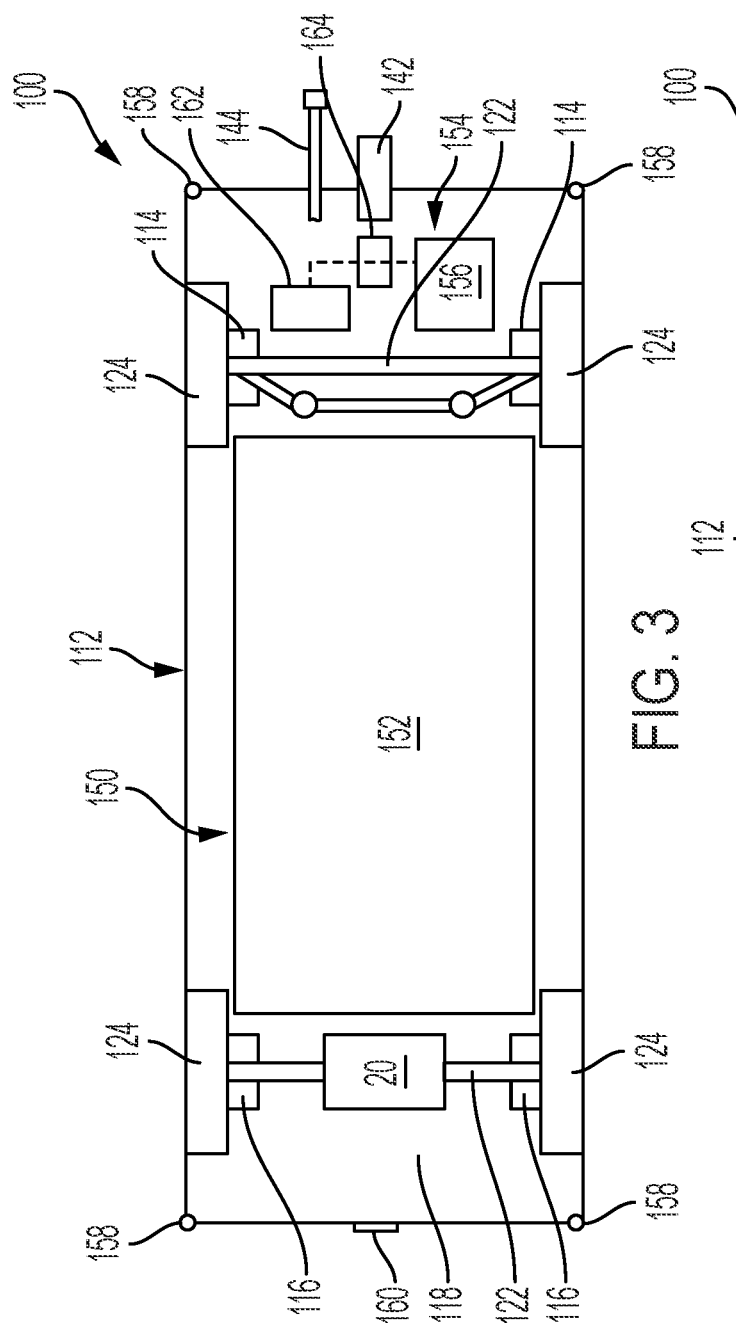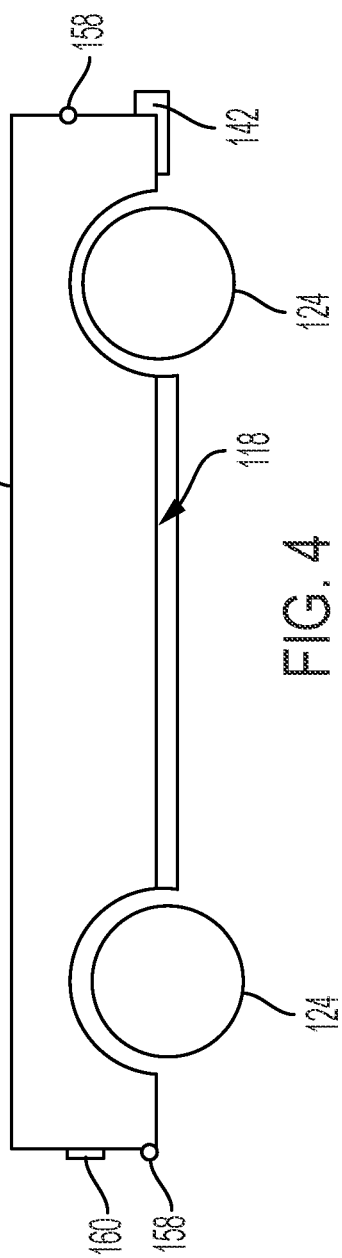

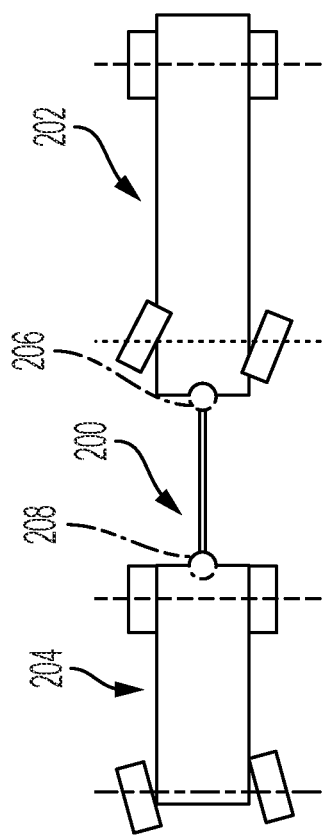
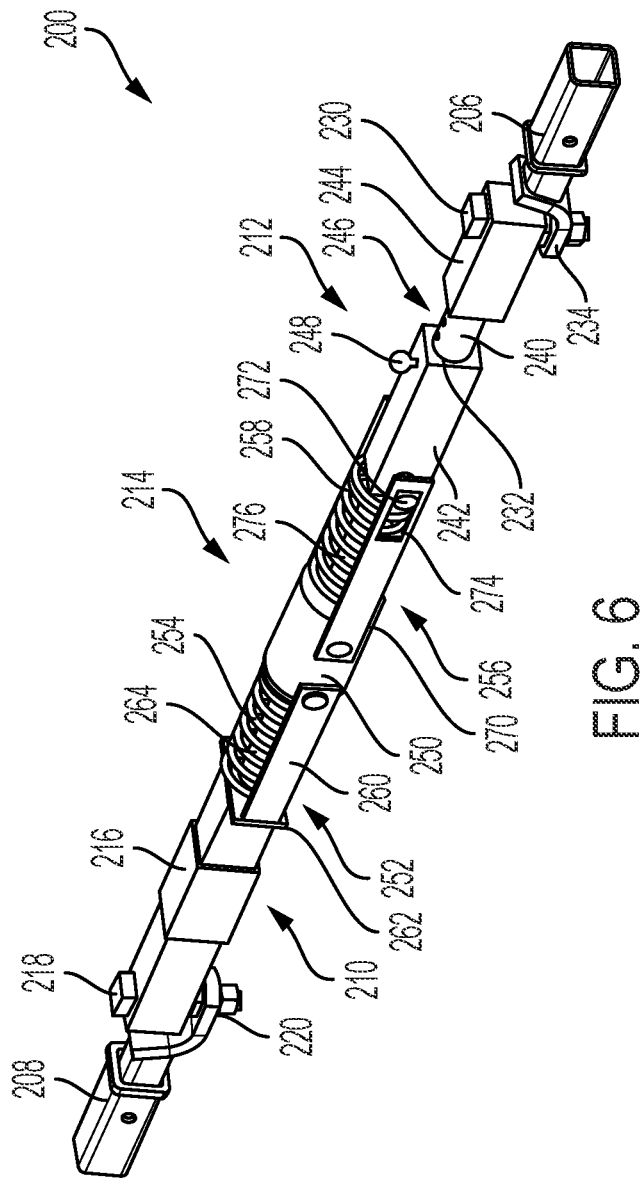
FIG. 5
FIG. 6

SELF SPOTTING TRAILER REVERSE SYSTEM

CROSS-REFERENCE TO RELATED APPLICATION

This application claims the benefit of U.S. Provisional Pat. App. No. 63/423,218 filed Nov. 7, 2022, the contents of which are incorporated herein by reference thereto.

FIELD

The present application relates generally to human machine interface systems for vehicles and, more particularly, to trailer reverse systems for vehicles integrated with self-propelled trailer systems.

BACKGROUND

Reversing with a trailer in confined spaces or high-traffic environments requires significant driver skill and often requires that a second person stand outside of the lead vehicle and communicate with the driver to warn them of obstacles that are out of the driver's field of view from the lead vehicle cabin. Obstacles in the path of travel of the trailer often become a threat long before they become visible to the driver. Moreover, steering inputs via the conventional steering wheel of the lead vehicle cause the trailer to turn in the opposite direction of the input, requiring trailer towers to perform a double reverse steering maneuver where the wheel of the lead vehicle is initially turned in the opposite direction of the intended turn in order to get the trailer pointed in the right direction. Accordingly, while such conventional trailer systems work well for their intended purpose, there is a desire for improvement in the relevant art.

SUMMARY

In accordance with an example aspect of the invention, a human machine interface (HMI) system for a multi-vehicle system having a lead vehicle and a trailer vehicle with independent propulsion and control is provided. In one example implementation, the HMI system includes a display disposed in the lead vehicle, a lead vehicle sensor suite, a trailer vehicle sensor suite, and a controller in signal communication with the display, the lead vehicle sensor suite, and the trailer vehicle sensor suite. The controller is configured to generate a trailer reverse screen on the display when the trailer vehicle is connected to the lead vehicle and operated in a trailer reverse mode. The trailer reverse screen includes (i) a trailer rear view showing a view from one or more cameras located on a rear of the trailer vehicle, (ii) a multi-vehicle system top view showing a view from above the multi-vehicle system based on signals from one or more cameras located on the multi-vehicle system, and (iii) a lead vehicle backup camera view from a lead vehicle backup camera, to thereby provide a driver of the lead vehicle with an intuitive perspective for reversing the trailer vehicle without aid from another person outside of the lead vehicle.

In addition to the foregoing, the described HMI system may include one or more of the following features: wherein the trailer rear view is a mirrored image of the view from the one or more cameras located on the rear of the trailer vehicle to give the user the perception of being seated on the rear of the trailer vehicle and facing rearward; and wherein the trailer rear view provides a view greater than or equal to a 180° viewing angle from a rear of the trailer vehicle to enable visual detection of cross-path objects that cannot be seen from within a cab of the lead vehicle.

In addition to the foregoing, the described HMI system may include one or more of the following features: a trailer reverse steering control knob in signal communication with the controller and configured to control a steering system of the lead and/or trailer vehicle based on driver input into the steering control knob; wherein a right-turn input into the steering control knob initiates a right turn of the trailer vehicle as viewed from a location on the rear of the trailer vehicle and facing rearward thereof, and wherein a left-turn input into the steering control knob initiates a left turn of the trailer vehicle as viewed from the location on the rear of the trailer vehicle and facing rearward thereof; and wherein on the multi-vehicle system top view, the controller is configured to overlay a plurality of camera icons corresponding to locations and orientations of cameras of the lead vehicle sensor suite and the trailer vehicle sensor suite, wherein user selection of one of the camera icons displays a view from that camera on the lead vehicle backup camera view.

In addition to the foregoing, the described HMI system may include one or more of the following features: wherein the trailer rear view is configured to display one or more warning icons when an object is detected by an ADAS system of the trailer vehicle sensor suite; wherein the controller is configured to issue an acoustic warning when the object is detected; wherein the controller is configured to generate and overlay dynamic steering lines on the trailer rear view to show a path of the trailer vehicle based on an orientation of wheels of the trailer vehicle wherein the dynamic steering lines show both a front trailer wheel trajectory and a rear trailer wheel trajectory to provide a clear visualization of an overall space occupied by the trailer vehicle during a reversing maneuver; and wherein the controller is configured to display the trailer reverse screen when a reverse gear of the lead vehicle is engaged.

In addition to the foregoing, the described HMI system may include one or more of the following features: wherein the multi-vehicle system top view shows static and moving objects surrounding the multi-vehicle system to provide a comprehensive picture of the surroundings of the multi-vehicle system to further eliminate the need for aid from another person outside of the lead vehicle; wherein a user may zoom-in to various areas of the multi-vehicle system top view to assess potential obstacles; wherein the controller is in signal communication with a tow bar system connecting the lead vehicle and the trailer vehicle; wherein the tow bar system includes at least one angle sensor configured to sense a first angle between the lead vehicle and the tow bar system, and a second angle between the trailer system and the tow bar system, wherein the controller is in signal communication with the at least one angle sensor; and wherein the tow bar system further includes an extension sensor configured to measure a level of extension of the tow bar system, and a load cell configured to sense forces on the tow bar system, wherein the controller is in signal communication with the extension sensor and the load cell.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do

BRIEF DESCRIPTION OF THE DRAWINGS

FIG. 3 is a bottom view of an example trailer platform system in accordance with the principles of the present application;

FIG. 4 is a side view of the trailer platform system shown in FIG. 3, in accordance with the principles of the present application;

FIG. 5 is a schematic illustration of an example tow bar system connecting a lead vehicle and a trailing vehicle, in accordance with the principles of the present application;

FIG. 6 is a perspective view of the example tow bar system shown in FIG. 5, in accordance with the principles of the present application;

DETAILED DESCRIPTION

Described herein are human machine interface (HMI) systems for lead vehicles configured to integrate with and tow self-propelled, battery electric vehicle (BEV) based trailer systems. The BEV trailers may be, for example, a wagon style (e.g., wheels at four corners) or traditional chassis trailer with a steerable axle such as those shown in FIGS. 1-4. Additionally, the BEV trailers may utilize a tow bar system such as that shown and described in FIGS. 5-7. The HMI control systems assist and enable the lead vehicle and/or trailer to perform reversing maneuvers without a "spotter" (a second person). Example systems/maneuvers are described in commonly owned U.S. patent application Ser. No. 18/190,540, filed Mar. 27, 2023, U.S. patent application Ser. No. 18/308,836, filed Apr. 28, 2023, and U.S. patent application Ser. No. 18/344,995, filed Jun. 20, 2023, the entire contents of which are incorporated herein by reference thereto.

As described herein, the HMI control systems provide the driver of a lead vehicle towing a trailer with an intuitive perspective for reversing their trailer without aid from someone outside of the vehicle. The system takes multiple camera input signals from cameras located on the lead vehicle and trailer and displays them to the driver via one or more displays in the cabin of the lead vehicle. The camera views displayed provide the driver of the lead vehicle with a perspective as if they were seated on the rear of the trailer (facing rearward), thereby allowing them to make steering inputs via a trailer reverse steering control knob and see these inputs translated to the same direction of travel via the one or more displays.

Additionally, ultrasonic sensors and cross-path radar detect obstacles or traffic that may be a risk to the trailer, giving the driver a full awareness of their surroundings that would otherwise require a second person who stands outside of the lead vehicle and communicates with the driver. When an obstacle is detected, the driver may be warned audibly, and the obstacle may either be displayed automatically to the driver on the display(s), or the driver may have the option to zoom in or bring up an entirely different camera view to better visualize the obstacle.

Example trailer systems are described in FIGS. 1-7. Example self-powered BEV trailer control systems are described in FIGS. 8 and 9. Example HMI systems for operating the lead vehicle and trailer vehicle are described in FIGS. 10-12.

Figure 1:
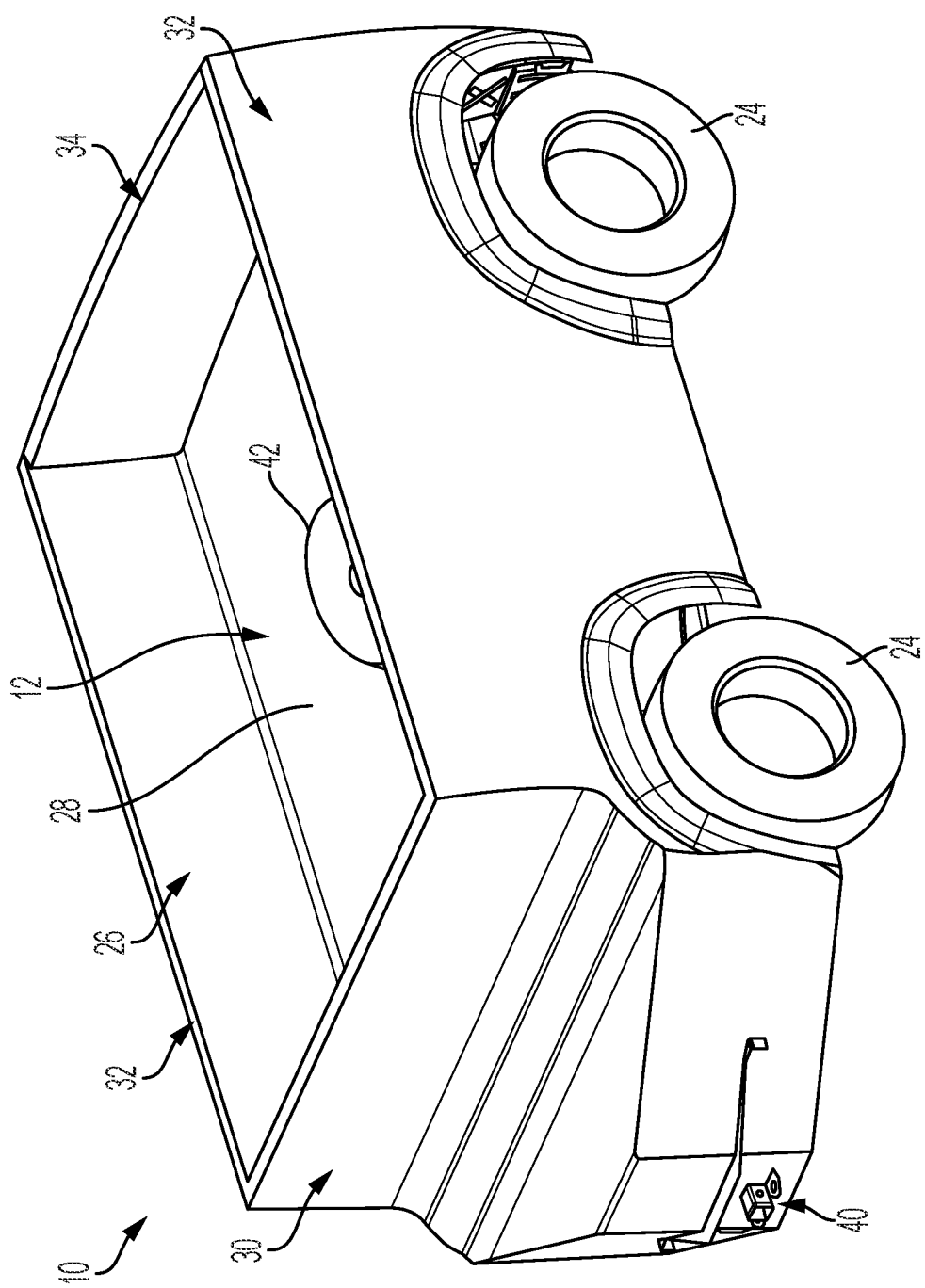
FIG. 1 is a perspective view of an example dolly platform system with independent propulsion and control, in accordance with the principles of the present application.
Figure 2:
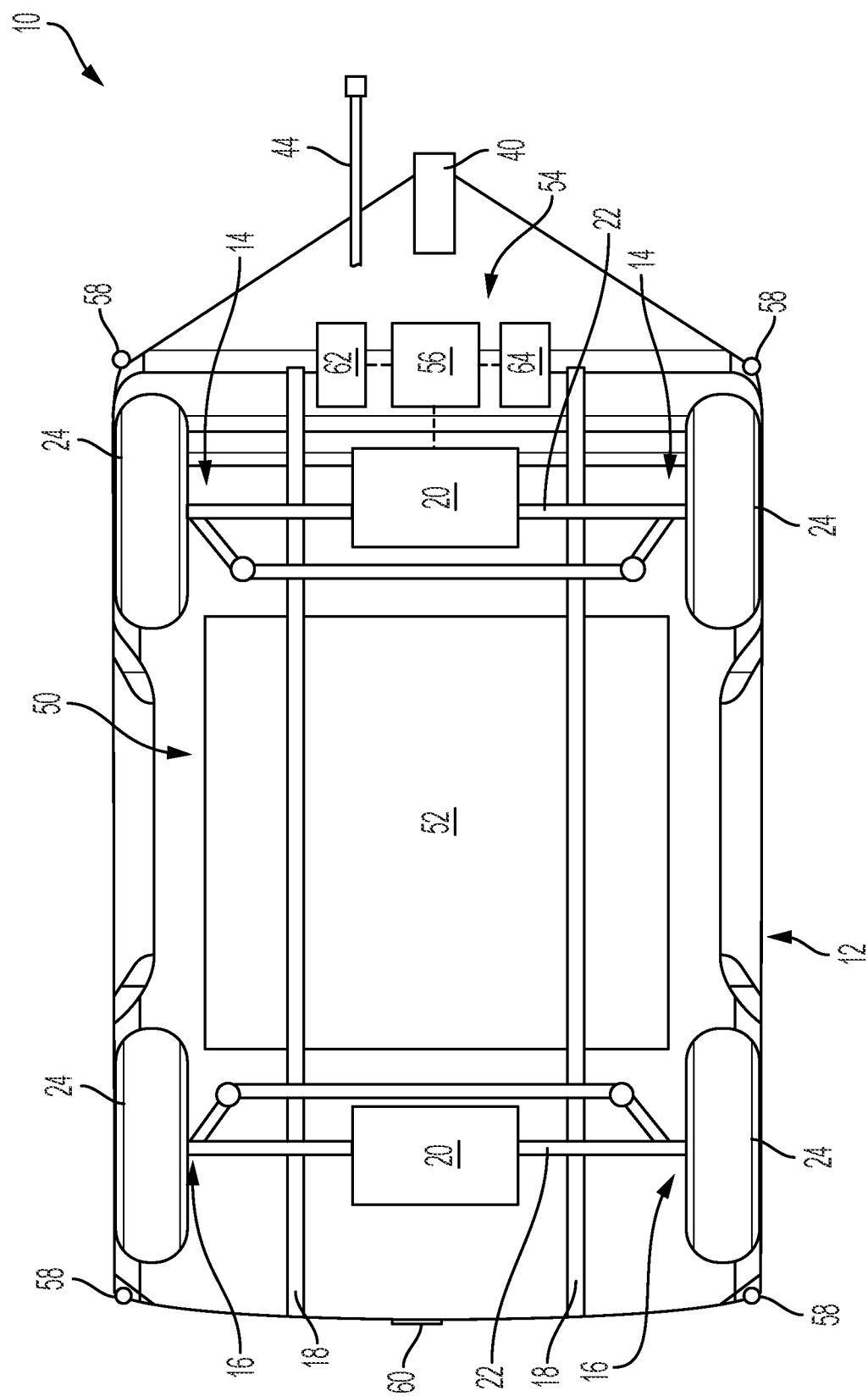
FIG. 2 is a bottom view of the dolly platform system shown in FIG. 1, in accordance with the principles of the present application.

With reference now to FIGS. 1 and 2, a trailer supporting dolly system with independent propulsion and control will be describe in more detail. In some examples, the trailer-supporting dolly system is an auxiliary power dolly that enables small vehicles to tow a trailer such as a gooseneck, fifth wheel, or traditional bumper-pull trailer. The dolly system provides the motive force and energy needed to tow a trailer via an electrified powertrain and batteries. The dolly system attaches to the lead vehicle via a tow bar and supports heavier loads and taller hitch height of a trailer that is specifically designed for trucks with in-bed connections (e.g., fifth wheel, gooseneck). The dolly system functions as a steering axle for the trailer to control its motion via steer-by-wire, and allows separate low-speed remote maneuvering for parking in confined spaces such as parking lots, campgrounds or charging stations.

The dolly system includes suspension (rate and travel) similar to the rear axle of one-ton DRW trucks or enclosed cargo vans. This provides the dolly system with its own ground force reactions for steering, acceleration, and braking to manage loading into the trailer hitch structure similar to "free pivot" designs. The dolly system can also include modular functionality greater than a pickup truck with a bed. For example, the dolly system can include a dump bed with modular side panels that transition between a flat bed and a walled-in bed depending on the cargo. The walled-in bed can include conventional bed sides/walls and a cover for typical truck bed usage. Because the dolly system can be remotely maneuvered at low speeds, the system is highly maneuverable for utility uses such as dumping mulch, collecting/moving firewood, waste/dumpster disposal, etc.

In the example embodiments, the dolly system is configured to support the weight of any type of trailer hitch and acts as an intermediary between the lead vehicle and the trailer. The intermediate body creates backwards compatibility between EVs and older trailers without their own power source. Onboard batteries improve range of the EV/trailer, and allow a smaller lead vehicle to tow a large trailer by handling most or all of the braking and accelerating. The front steering axle pulls the trailer around corners and allows it to accurately follow the lead vehicle path. A low-speed remote maneuvering function allows the trailer to steer into tight spaces with ease. The dolly system's truck bed sides and small size allow users to experience the functionality and utility of a truck only when they need it, allowing them to own a smaller, cheaper, and more fuel efficient vehicle that suits daily use needs.

The dolly system described herein advantageously provides backwards compatibility for EVs to pull older trailers, does not require users to purchase a new trailer in order to maintain towing range, and allows the driver to steer the trailer much more easily than a conventional trailer because of the active steering axle. The system also provides more control than the passive steering axle of an automated safety hitch, and allows a much smaller vehicle to tow/lead the trailer because of the stability of its four-wheeled chassis and electrified powertrain. As such, the dolly system does all the work of braking, accelerating and steering of the trailer, leaving the lead vehicle to simply be a guide.

With continued reference to FIGS. 1 and 2, a trailer-supporting tug/dolly platform system 10 with independent and autonomous propulsion and control is illustrated. The dolly system 10 advantageously provides a non-powered trailer with a powered trailer having autonomous steering capabilities. The dolly system 10 includes a load platform 12 located above and supported by a front suspension 14, a rear suspension 16, and a frame or chassis 18. The dolly system 10 includes an electric powertrain having one or more electric traction motors 20 that generate and transfer torque to one or more steerable axles 22 and wheels 24 via intermediate components (e.g., a transmission, shafts, differential). The electric traction motor(s) 20 are electrically coupled to and powered by a high voltage battery system 50 having one or more battery packs or modules 52, as described herein in more detail.

In one exemplary implementation, the dolly system 10 is similar to a pickup truck bed, as illustrated. The load platform 12 provides a truck bed or cargo area 26 defined at least partially by a floor 28, a forward wall 30, side walls 32, and a tailgate 34. One or more of the forward wall 30, side walls 32, and tailgate 34 may be removable to transition the dolly system 10 into various configurations for towing and/or cargo hauling. Moreover, the load platform 12 may be articulatable to function as a dump bed.

In the example embodiment, the dolly system 10 includes a lead vehicle hitch connection 40, a trailer hitch structure 42, and a high voltage power connection 44. The lead vehicle hitch connection 40 is configured for removable coupling with a lead vehicle (not shown), for example via the tow bar system 200 described herein. The trailer hitch structure 42 is coupled to the floor 28 and configured to removably couple to a trailer (not shown) such as a fifth wheel or gooseneck trailer. The high voltage power connection 44 is configured to electrically couple to a corresponding connection of the lead vehicle (not shown). The high voltage connection 44 is electrically coupled to the battery pack(s) 52 to enable power connection between the dolly system 10 and the lead vehicle. In this way, battery charge can be shared or redirected between the electric dolly system 10 and an electric lead vehicle.

As shown in FIG. 2, the dolly system 10 includes an advanced driver assistance system (ADAS)/autonomous driving system 54 that generally includes a controller 56, one or more sensors 58, one or more cameras 60, a steer-by-wire control module 62, and one or more actuators 64. The controller 56 is configured to control operation of the dolly system 10 as well as execute at least one ADAS/autonomous driving feature. The sensors 58 and cameras 60 are configured to capture/measure data utilized by the ADAS/autonomous driving system 54 to control the dolly system 10. The steer-by-wire control module 62 is configured to operate the actuators 64 to control driving/operation of the dolly system 10 as part of the ADAS/autonomous driving feature. In this way, the controller 56 is configured to control the electric traction motor(s) 20 and the steerable axle(s) 22 and can be configured for autonomous or manual control of the dolly system 10. Moreover, the controller 56 or other components (e.g., sensors 58, cameras 60) of the ADAS/autonomous driving system 54 may be in signal communication with the lead vehicle (e.g., via electrical connection, wireless, CAN bus, lead vehicle ADAS system, etc.) for cooperative and integrated operation between the dolly system 10 and lead vehicle.

In operation, the dolly system 10 provides motive force and power to tow a trailer via an electrified powertrain and HV battery system 50, including independently performing some or all braking and acceleration of the trailer. This reduces or eliminates power demands on the towing vehicle for acceleration and braking, which allows a smaller vehicle to tow a larger trailer, since the dolly system 10 can balance itself and is not dependent on the towing vehicle to carry significant trailer tongue weight. The dolly system 10 supports the heavier loads and taller hitch height of a trailer specifically designed for trucks with in-bed connections. Advantageously, the dolly system 10 includes its own suspension 14, 16 to provide its own ground force reactions for steering, acceleration and braking to manage loading in the trailer hitch structure. Moreover, the ADAS/autonomous driving system 54, including the steer-by-wire control module 62, is utilized to control the steering axle(s) 22 to provide and control its own motion of the attached trailer. Additionally, the dolly system 10 can be controlled (e.g., driven) in a low-speed remote maneuvering mode via a control unit (not shown) such as, for example, a user interface in the towing vehicle, a user interface on the dolly system, a smart phone app, etc. This is particularly useful for parking in tight confines such as parking spaces, charging stations, camping sites, etc.

With reference now to FIGS. 3 and 4, a trailer platform system with independent propulsion and control will be described in more detail. In some examples, the trailer platform system is a self-propelled battery electric vehicle (BEV) based, wagon style (e.g., wheel at four corners) trailer, with autonomous driving control capability. The trailer platform system generally includes a chassis, wheels, tires, suspension, brakes, a battery pack, electric drive motor(s), control modules (e.g., controllers), a steer-by-wire system, camera(s), and/or sensor(s). The system operates by interacting with some or all of the following components on the lead vehicle: vehicle CAN bus, trailer hitch load cell, vehicle dynamics control module(s), and autonomous sensors and ADAS control module(s). The system is also configured to share battery charge between the lead vehicle and the trailer platform.

In the example embodiment, the trailer platform system provides the motive force and energy needed to tow a trailer via an electrified powertrain and batteries. The system attaches to the lead vehicle (e.g., through a wireless or wired connection and a tow bar) and is configured to support its own weight. The trailer includes a steering axle to control its motion via steer-by-wire and allows separate low-speed remote maneuvering. The trailer system includes a suspension (rate and travel) similar to the rear axle of a one-ton DRW truck or enclosed cargo van to provide its own ground force reactions for steering, acceleration and braking, to thereby manage loading and clearance to the lead vehicle. In one example, with a highly autonomous lead vehicle, the lead vehicle can control the trailer remotely to the autonomy level, and associated cost and weight of the trailer can be reduced by eliminating the ADAS sensors and controllers from the trailer.

In some examples, the included battery pack, motor(s), and controller(s) are sized to reduce or eliminate power demands on the lead vehicle for acceleration and braking. The wagon style trailer setup (with wheels at the four corners of the trailer instead of near the middle of the trailer length for traditional towed trailers) will allow a smaller vehicle to tow a larger trailer, since the trailer can balance itself and is not dependent on the lead vehicle to carry significant trailer tongue weight. The dynamic steering and propulsion/braking capability allows the trailer to correct the trailer's path when turning while moving in forward or reverse to follow the lead vehicles intended path more closely than traditional trailers. This can also allow for trailer obstacle avoidance and enhanced trailer stability control.

The trailer platform system advantageously provides autonomous dynamic control (e.g., acceleration, braking, steering) to a trailer, controlled either through self-contained systems or communication with lead vehicle autonomous systems. The wagon-style chassis can be used in light and medium duty trailer categories for on-road use. The actively steered axle allows greater steering control and the ability to reverse as compared to low-speed farm/utility wagons.

With continued reference to FIGS. 3 and 4, a trailer platform system 100 with independent and autonomous propulsion and control is illustrated. The trailer platform system 100 includes a load platform 112 located above and supported by a front suspension 114, a rear suspension 116, and a frame or chassis 118. The trailer platform system 100 includes an electric powertrain having one or more electric traction motors 120 that generate and transfer torque to one or more steerable axles 122 and wheels 124 via intermediate components (e.g., a transmission, shafts, differential). The electric traction motor(s) 120 are electrically coupled to and powered by a high voltage battery system 150 having one or more battery packs or modules 152. As illustrated, in the example embodiment, the wheels 124 are located at the four corners of the trailer instead of near the middle of the trailer length.

In the example embodiment, the trailer platform system 100 includes a lead vehicle hitch connection 142 and a high voltage power connection 144. The hitch connection 142 is coupled to the chassis 118 and is configured for removable coupling with a lead vehicle (not shown), for example via the tow bar system 200 described herein. The high voltage power connection 144 is configured to electrically couple to a corresponding high voltage connection of the lead vehicle (not shown). The high voltage power connection 144 is electrically coupled to the battery pack(s) 152 to enable power connection between the trailer platform system 100 and the lead vehicle. In this way, battery charge can be shared or redirected between the electrically driven trailer platform system 100 and an electric lead vehicle.

As shown in FIG. 3, the trailer platform system 100 includes an advanced driver assistance system (ADAS)/autonomous driving system 154 that generally includes a controller 156 (e.g., PCM), one or more sensors 158, one or more cameras 160, a steer-by-wire control module 162, and one or more actuators 164. The controller 156 is configured to control operation of the trailer platform system 100 as well as execute at least one ADAS/autonomous driving feature. The sensors 158 and cameras 160 are configured to capture/measure data utilized by the ADAS/autonomous driving system 154 to control the trailer platform system 100. The steer-by-wire control module 162 is configured to operate the actuators 164 to control driving/operation of the trailer platform system 100 as part of the ADAS/autonomous driving feature. In this way, the controller 156 is configured to control the electric motor(s) 120 and the steerable axle(s) 122 and can be configured for autonomous or manual control of the trailer platform system 100. Moreover, the controller 156 or other components (e.g., sensors 158, cameras 160) of the ADAS/autonomous driving system 154 may be in signal communication with the lead vehicle (e.g., via electrical connection, wireless connection, CAN bus, lead vehicle ADAS system, etc.) for cooperative and integrated operation between the trailer platform system 100 and lead vehicle.

In operation, the trailer platform system 100 provides motive force and power to tow a trailer via an electrified powertrain and HV battery system 150, including independently performing some or all braking and acceleration of the trailer. This reduces or eliminates power demands on the towing vehicle for acceleration and braking, which allows a smaller vehicle to tow a larger trailer, since the trailer platform system 100 can balance itself and is not dependent on the towing vehicle to carry significant trailer tongue weight. Advantageously, the trailer platform system 100 includes its own suspension 114, 116 to provide its own ground force reactions for steering, acceleration and braking to manage loading in the trailer hitch structure. Moreover, the ADAS/autonomous driving system 154, including the steer-by-wire control module 162, is utilized to control the steering axle(s) 122 to provide and control its own trailer motion. Additionally, the trailer platform system 100 can be controlled (e.g., driven) in a low-speed remote maneuvering mode via a control unit (not shown) such as, for example, a user interface in the towing vehicle, a user interface on the trailer platform system, a smart phone app, etc. This is particularly useful for parking in tight confines such as parking spaces, charging stations, camping sites, etc.

Figure 7:
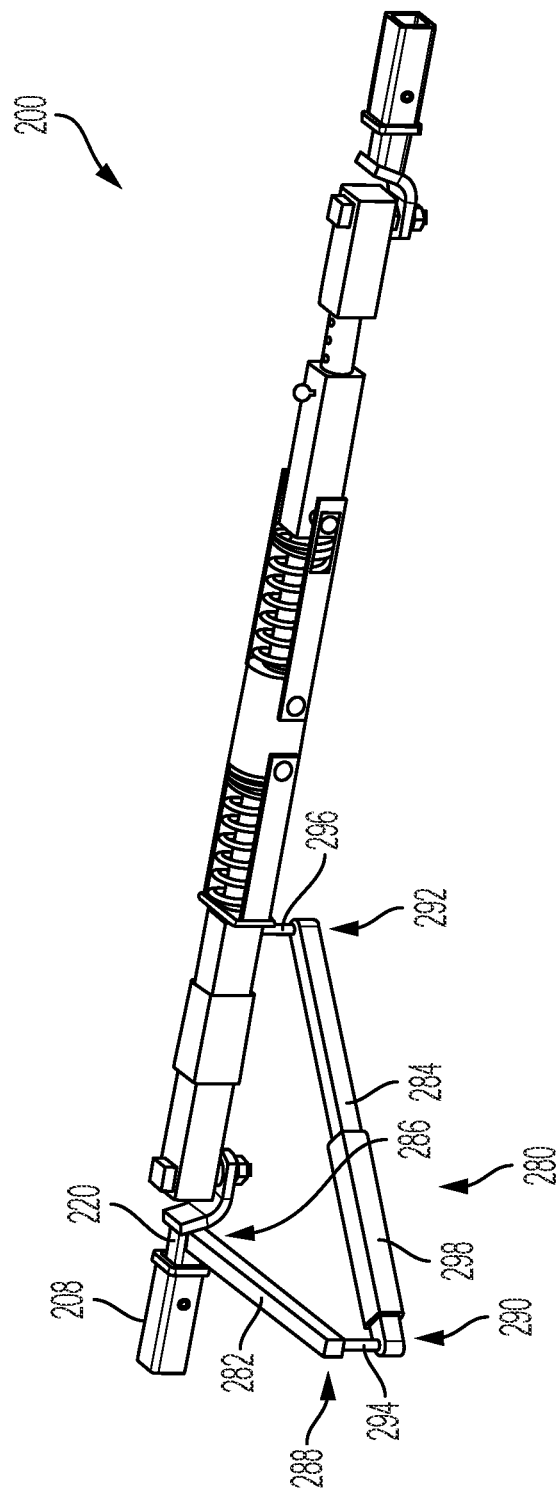
FIG. 7 is a perspective view of the example tow bar system shown in FIG. 6 with an example horizontal lockout assembly, in accordance with the principles of the present application.

With reference now to FIGS. 5-7, a tow bar system to provide a physical linkage between a lead vehicle and trailer vehicle will be described in more detail. In some examples, the tow bar system is configured for independently steered and powered trailers and includes: (a) a five degree of freedom connection at both ends of the tow bar to allow articulation between the two vehicles, (b) a means of adjusting the length of the bar between the lead and follow vehicles, (c) a means of locking the adjusted length after the connection has been made between the vehicles, (d) a means to absorb harsh compressive loads that could occur while braking or steering, (e) a means to absorb harsh tensile loads that could occur while accelerating or steering, (f) a means to support and route an electrical cable connection between the lead and follow vehicles, (g) an optional means to sense angular difference between the tow bar and either one or both lead and follow vehicle, (h) a means of sensing tensile and compressive loads in the tow bar, and/or (i) an optional means to lockout the lateral steering degree of freedom at one end of the tow bar. The mechanical assembly is configured to attach between the rear trailer towing connection of the lead vehicle and a front/center towing connection like a typical rear towing connection.

The tow bar system provides a physical linkage between two vehicles that have the independent ability to accelerate and decelerate (fore/aft) via human or autonomous control, and steer laterally via human or autonomous driving control.

The system provides additional degrees of freedom as a link between the two vehicles to allow improved articulation between the leading and following vehicles, leaving only a tension/compression load and nominal length constraint. The system does not support vertical loading between the two vehicles, so no weight is transferred therebetween and having a negative effect on the handling of them individually or as a pair. The system also does not transfer lateral moment loading between the vehicles unless a tensile or compressive load is created by a speed differential between the vehicle attachment points. This feature will eliminate any possibility of the following vehicle imparting trailer sway to the lead vehicle, and allow the lead and follow vehicles to maintain an offset within the lane width when it may be advantageous for crosswind drag or visibility in outside lanes. As such, the tow bar system allows vehicles that may be mismatched in terms of turning radius (e.g., due to differences in wheelbase) to follow in a best fit path via independent physical, but electronically linked steering, acceleration, and braking controls.

Additionally, the tow bar system advantageously provides one or more of the following optional benefits over conventional trailer attachment: (a) additional angular tolerance for the connection eliminates the need for jacking or height adjustments on flat or angled ground; (b) optional selectable length adjustment combined with feature (a) eliminates the need for a precise distance between the two vehicles; (c) once the mechanical connections have been made the nominal length will be set and locked at the bar, or by moving one of the vehicles to the next locking point; (d) allowing for some compression travel within the tow bar will allow for latency between the lead vehicle initiating a braking event before the following vehicle can respond precisely. A relatively small amount of compressive travel will reduce the load on the two bar and any shock or bump that might be felt by the vehicle occupants; (e) allowing some extension travel provides the same benefits as feature (d) for acceleration and can also be used if it is desirable for the following vehicle to have a higher braking power to keep the connection in-line with the lead vehicle; (f) the structure of the tow bar can serve as a support for communications and power transfer harnesses between the lead and follow vehicles, though a wired connection may not be required if wireless technology is used; (g) optional measurement of the angle of the tow bar to the lead and follow vehicles could be used as a primary or backup sensing to the onboard electronics of the lead and/or follow vehicles, while sensing angle directly at the tow bar can prevent jackknife/contact events while making low speed maneuvers in forward or reverse; (h) sensing the tensile and compressive loading present in the tow bar can provide a primary or secondary means of balancing or targeting a desired force during acceleration, cruising at steady speed and braking forces between the two vehicles; and (i) optional ability to lock the lateral pivoting of the tow bar at one end, which allows for the recovery of a following vehicle that may not have lost electrical power to maintain its independent steering operation or may have reduced braking performance. The lock could be set manually or while driving if a loss of power or function is detected.

In some examples, the tow bar system advantageously provides: spherical degrees of freedom at both ends of the tow bar, which allows active steering of the trailing vehicle, as opposed to flat towing where the front wheels of the tow vehicle must follow the path dictated by a rigid tow bar. The system also includes a powered trailer, which allows reversing maneuvers that are not possible with flat towing. Steering of the trailer is controlled electronically, allowing reverse movement without jackknifing, and left-right bias relative to the lead vehicle. The system supplies all or most of the pulling power needed to move the trailer with any lead vehicle, as enabled by a load cell in the tow bar. The system is a simply supported beam connection so the lead vehicle does not have to support the trailer's weight.

With continued reference to FIGS. 5-7, a tow bar system 200 for independently steered and powered trailers is illustrated. As shown in FIG. 5, the tow bar system 200 is configured to removably couple a trailing vehicle 202 (e.g., a trailer) to a lead vehicle 204. The trailing vehicle 202 includes a hitch receiver 206, and the lead vehicle includes a hitch receiver 208. As shown in FIG. 6, the tow bar system 200 generally includes a front tow bar 210 and a rear tow bar 212 coupled by a damper system 214. The tow bar system 200 is configured to support and route an electrical cable connection (not shown) between the lead and follow/tow vehicles, for example to provide signal communication (e.g., from sensors, cameras, etc.) or shared high voltage therebetween.

In the example embodiment, the front tow bar 210 is configured to removably couple to a hitch 220 received by the lead vehicle hitch receiver 208. As illustrated, the front tow bar 210 includes a load cell 216 and an angle sensor 218. The load cell 216 is configured to sense various forces on the tow bar system 200 including a trailer tongue weight, tension, and compression. The angle sensor 218 is configured to sense an angle between the lead vehicle 204 and a longitudinal axis of the front tow bar 210. The load cell 216 and the angle sensor 218 are in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the load cell 216 and angle sensor 218 to control one or more operations of the vehicles 202, 204.

The rear tow bar 212 is configured to removably couple to a hitch 234 received by the trailing vehicle hitch receiver 206. The rear tow bar 212 includes an angle sensor 230 and a length adjustment and locking mechanism 232. The angle sensor 230 is configured to sense an angle between the trailing vehicle 202 and the longitudinal axis of the rear tow bar 212. The angle sensor 230 is in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the angle sensor 230 to control one or more operations of the vehicles 202, 204.

In the example embodiment, the length adjustment and locking mechanism 232 generally includes a locking bar 240 extending between a forward bar 242 and a rearward bar 244. The locking bar 240 is rigidly coupled to the rearward bar 244 and is slidingly received within the forward bar 242. The locking bar 240 includes a plurality of axially spaced apertures 246 configured to selectively receive a pin 248 therein to lock-in the relative distance between the forward bar 242 and the rearward bar 244. The pin 248 is removable to allow sliding adjustment of the locking bar 240 to establish a desired length of the rear tow bar 212. It will be appreciated however that rear tow bar 212 may have any suitable alternative configuration that enables length adjustment of the rear tow bar 212, and such a length adjustment system may additionally or alternatively be utilized with the front tow bar 210.

In the example implementation, the damper system 214 is disposed between the front tow bar 210 and the rear tow bar 212 and generally includes a damper 250, a front support 252, a front biasing mechanism 254 (e.g., a spring), a rear support 256, and a rear biasing mechanism 258 (e.g., a spring).

The front support 252 includes a pair of spaced apart support bars or members 260 with first ends coupled to an end plate 262, and opposite second ends coupled to the damper 250. The end plate 262 is coupled to and/or disposed against the front tow bar 210. The front biasing mechanism 254 is disposed about a front guide post 264 and positioned between the end plate 262 and the damper 250. The front guide post 264 is integral with or rigidly coupled to the front tow bar 210 and extends through an aperture formed in the end plate 262. In one example embodiment, the front biasing mechanism 254 is an extension spring configured to bias the front tow bar 210 and damper 250 towards each other, and absorb tensile forces in the tow bar system 200. The damper 250 is a generally cylindrical damping member fabricated from a suitable damping material configured to absorb forces (e.g., tension, compression) experienced in the tow bar system 200 during towing operations.

The rear support 256 includes a pair of spaced apart support bars or members 270 with first ends coupled to the damper 250, and opposite second ends coupled to the rear tow bar 212, for example, via the illustrated pins 272. The second end of each support member 270 includes a window 274 configured to slidingly receive pin 272. In this way, pins 272 are configured to translate fore/aft within the windows 274. The rear biasing mechanism 258 is disposed about a rear guide post 276 and positioned between the damper 250 and the rear tow bar 212. The rear guide post 276 is integral with or rigidly coupled to the rear tow bar 212. In one example embodiment, the rear biasing mechanism 258 is a compression spring configured to bias apart the damper 250 and rear tow bar 212 and absorb compressive forces in the tow bar system 200.

FIG. 7 illustrates the tow bar system 200 with a horizontal lockout assembly 280 configured to lock out the lateral steering degree of freedom at one end of the tow bar if steering control is lost on the trailing vehicle 202. In this way, the horizontal lockout assembly 280 is configured to turn the tow bar system 200 into a rigid tow bar to prevent loss of lateral control.

In the example embodiment, the horizontal lockout assembly 280 generally includes a horizontal bar or member 282 and an angled bar or member 284. The horizontal member 282 includes a first end 286 coupled to the hitch 220 and an opposite second end 288. The angled member 284 includes a first end 290 and an opposite second end 292. The first end 290 is pivotally coupled to the horizontal member second end 288 via a pin 294, and the second end 292 is pivotally coupled to the front tow bar 210 via a pin 296. The angled member 284 includes a sliding joint 298 that enables a length of the angled member 284 to change to allow a full range of articulation of the tow bar system 200. If there is a loss of power and/or communication with the trailing vehicle 202, the sliding joint 298 is configured to lock and prevent loss of lateral control of the trailing vehicle 202.

In operation, the tow bar system 200 is configured to absorb harsh tensile and compressive loads that occur while steering, braking, and accelerating. Moreover, the length of tow bar system 200 is adjustable via the length adjustment and locking mechanism 232. The various sensors included with tow bar system 200 enable sensing of tensile/compressive loads as well as the angular difference between the tow bar and the lead and follow vehicles. This enables a self-powered, steering capable follow vehicle (e.g., dolly system 10, trailer platform system 100) to accelerate/decelerate, brake, and steer via human or autonomous control. As such, the tow bar system 200 enables a vehicle/trailer that may be mismatched in terms of turning radius to follow in a best fit path via independent physical, electronically linked steering, acceleration, and braking controls.

Figure 8:
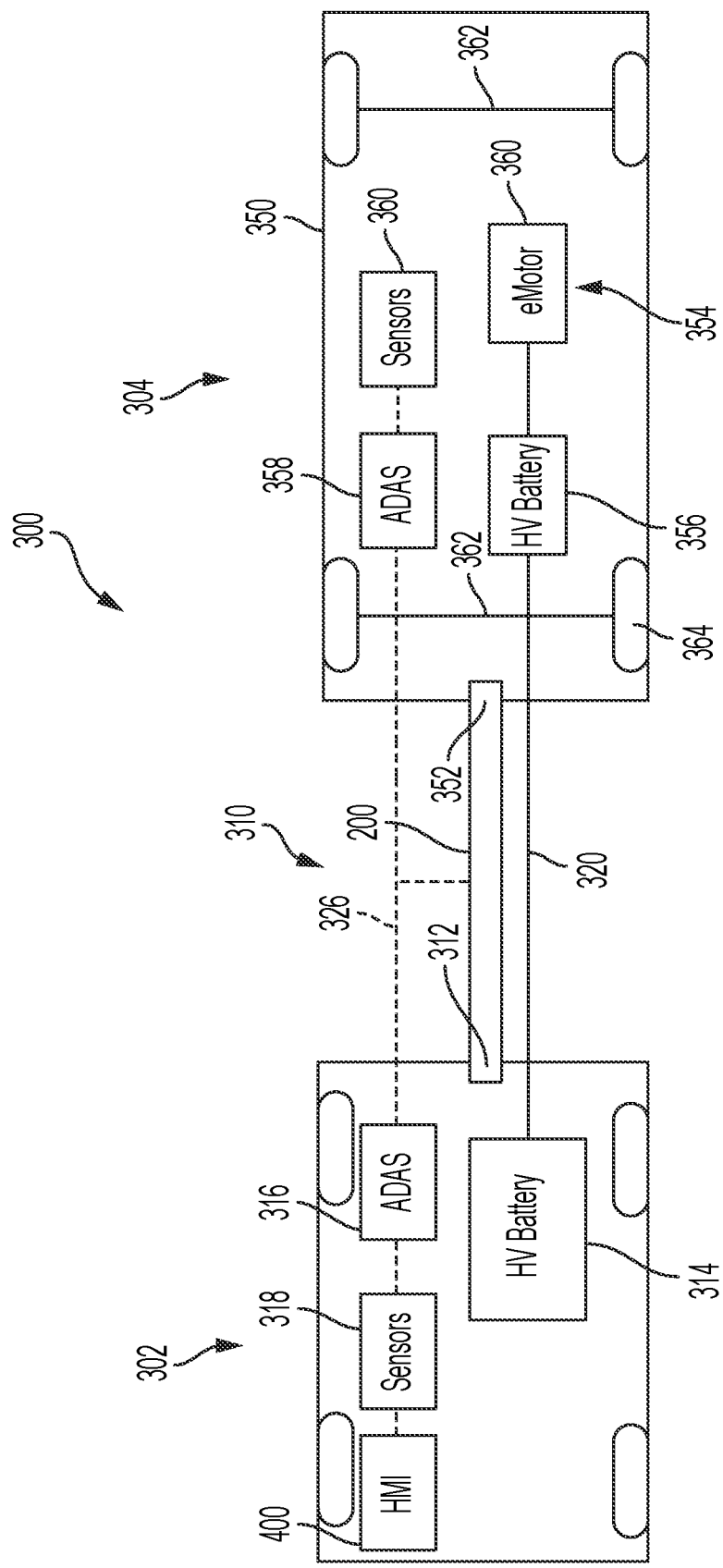
FIG. 8 is a schematic illustration of an example multi-vehicle system with a lead vehicle and self-powered trailer vehicle in accordance with the principles of the present application.

With reference now to FIG. 8, a control system for a self-propelled trailer will be described in more detail. The trailer control system is configured to make towing easier by automatically optimizing the path of the trailer. The maneuvering capability of a self-propelled trailer with a steerable axle (e.g., trailer systems 10, 100) along with a tow bar system (e.g., tow bar system 200) enables the trailer to adjust and optimize its path of travel, as well as correct driver errors to improve safety and driveability.

In this way, the trailer control system enables the trailer to respond to its environment and change its direction of travel dynamically, for example, if obstacles (e.g., vehicles, pedestrians) appear during trailering maneuvers. Moreover, the trailer control system enables the trailer to move relative to the lead vehicle while still remaining attached thereto. To perform such operations, the trailer control system includes ADAS sensing capability through its own sensor system and/or the sensor system of a lead vehicle.

Directional control of the trailer can further be accomplished by sensors in the tow bar system such as, for example, angle sensors at one or both ends of the tow bar where pivoting occurs, a linear accelerometer or displacement sensor to measure relative acceleration of the lead vehicle and trailer, and force sensors to measure tension/compression loads between the lead vehicle and trailer. Additionally, CAN signals such as wheel speed, steering angle, and throttle/steering command may be shared between the lead vehicle and the trailer control system.

The trailer control system also improves maneuvering the lead vehicle and trailer in reverse by eliminating the need for the driver to make complex double reverse steering maneuvers to initiate a turn. In operation, the trailer's own steering axle(s) respond to steering control inputs of the lead vehicle and initiate the turn itself. In some operations, the lead vehicle only needs to maneuver to follow the trailer around the turn, thereby enabling improved lane keeping and decreasing the risk of collision with obstacles that may be encountered while reversing or parking. Additionally, with the tow bar system described herein, the trailer control system enables the lead vehicle to offset horizontally from the trailer while reversing, thereby improving visibility, for example when backing up toward boat launches or into tight parking spots.

With continued reference to FIG. 8, a multi-vehicle system (MVS) 300 includes a lead vehicle 302 and one or more self-propelled trailer vehicles 304 that may be connected via a tether such as tow bar system 200 (shown in FIGS. 5-7). In other examples, the vehicles 302, 304 operate without a mechanical linkage therebetween. In the example embodiment, the multi-vehicle system 300 includes a multi-vehicle control system (MVCS) 310 for the primary lead vehicle 302 and one or more self-propelled and self-guided secondary vehicles 304. The MVCS 310 is in signal communication with the lead vehicle 302, the trailer vehicle(s) 304, and/or the tow bar system 200. The MVCS 310 is configured to receive various inputs such as, for example, driver control inputs, inputs from various ADAS sensors, pre-programmed preferences and settings, or inputs from other sources. Based on the received inputs, the MVCS 310 constructs output(s)

to optimize performance of the multi-vehicle system 300. In this way, the MVCS 310 treats the multiple vehicles as separate, but dynamically connected bodies, and translates driver inputs into optimal full-system performance.

In the example embodiment, the MVCS 310 is a multi-vehicle dynamic ADAS/autonomous driving system with sensing and computing capability housed in the lead vehicle 302 and/or the secondary vehicle 304 and connected via a physical tether or secure wireless connection. The MVCS 310 is in signal communication with and/or integrated with a lead vehicle HMI system 400 to provide information and control to the driver of the multi-vehicle system 300, as will be described herein in more detail.

The lead vehicle 302 may be any suitable towing vehicle. However, in the illustrated example, lead vehicle 302 generally includes a trailer hitch 312, a high voltage battery system 314, an ADAS/autonomous driving system 316 operably connected to a sensor suite 318, and the HMI system 400. The trailer hitch 312 is configured to removably couple to the tow bar system 200 or directly to the trailer vehicle 304. The high voltage battery system 314 is configured to power one or more electric traction motors (not shown) of the lead vehicle 302. A high voltage connection 320 is configured to electrically couple the high voltage battery system 314 with the self-powered trailer vehicle 304, for example, to provide bi-directional charging therebetween.

Figure 9:
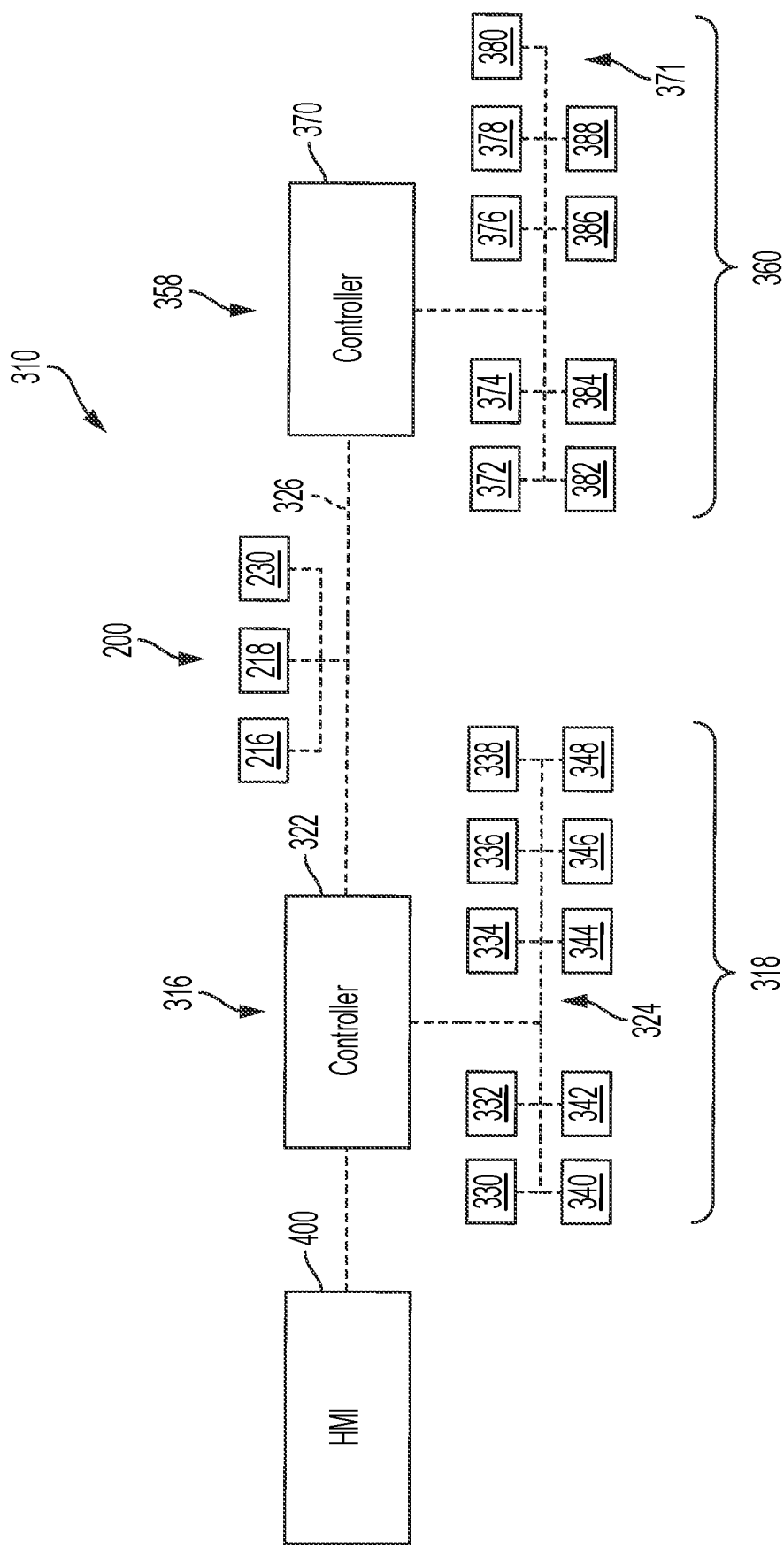
FIG. 9 is a schematic illustration of an example multi-vehicle control system (MVCS) of the multi-vehicle system of FIG. 8, in accordance with the principles of the present application.

With additional reference to FIG. 9, in the example embodiment, the ADAS/autonomous driving system 316 includes a controller 322 in signal communication with the sensor suite 318 and the HMI system 400, for example, via a CAN bus 324. The ADAS/autonomous driving system 316 is further in signal communication with the tow bar system 200 and/or trailer vehicle 304 via a wired or wireless connection 326. As shown in FIG. 6, the tow bar system 200 includes angle sensors 218, 230 configured to sense an angle between the tow bar system 200 and the lead vehicle 302 and/or trailer vehicle 304, as well as a load cell 216 configured to sense various forces on the tow bar (e.g., trailer tongue weight, tension, compression, length change, acceleration, etc.).

In the illustrated example, the sensor suite 318 generally includes a vehicle speed sensor 330, vehicle steering sensor 332, wheel speed sensors 334 (e.g., one for each wheel), accelerometer(s) 336, a throttle position sensor 338, a brake sensor 340, blind spot monitoring/cross path sensor(s) 342, ultrasonic park sensor(s) 344, one or more cameras 346 (e.g., back up, park view side, drone, etc.), and a battery charge monitoring sensor 348. However, it will be appreciated that sensor suite 318 may include any additional sensors that enable trailer vehicle 304 to function as described herein.

With continued reference to FIGS. 8 and 9, in the example embodiment, the trailer vehicle 304 is a self-propelled, BEV based trailer with at least one steerable axle such as, for example, the trailer systems 10, 100 described herein. Trailer vehicle 304 generally includes a chassis/platform 350, a hitch connection 352, a BEV powertrain 354, a high voltage battery system 356, and an ADAS/autonomous driving system 358 operably connected to a sensor suite 360. The hitch connection 352 is configured to removably couple to the tow bar system 200 or directly to the lead vehicle 302. The BEV powertrain 354 includes one or more electric traction motors 360 that generate and transfer torque to one or more steerable axles 362 and wheels 364 via intermediate components (e.g., a transmission, shafts, differential, etc.). The high voltage battery system 356 is configured to power the BEV powertrain 354 and electrically couple to the lead vehicle 302, for example, via the high voltage connection 320.

As shown in FIG. 9, in the example embodiment, the ADAS/autonomous driving system 358 includes a controller 370 in signal communication with the sensor suite 360, for example via a CAN bus 371. The ADAS/autonomous driving system 358, which integrates with or is part of MVCS 310, includes steer-by-wire, throttle-by-wire, and brake-by-wire modules (not shown) or functionality. The ADAS/autonomous driving system 358 is further in signal communication with the tow bar system 200 and/or lead vehicle 302 (e.g., ADAS/autonomous driving system 316) via the wired or wireless connection 326. In this way, MVCS 310 is configured to receive signals from the lead vehicle 302 and/or tow bar system 200 indicating system conditions such as, for example, lead vehicle steering, throttle position, wheel speed, relative angular positioning, etc.

In the illustrated example, the sensor suite 360 generally includes a trailer speed sensor 372, a trailer steering sensor 374, wheel speed sensors 376 (e.g., one for each wheel), accelerometer(s) 378, a brake sensor 380, blind spot monitoring/cross path sensor(s) 382, ultrasonic park sensor(s) 384, one or more cameras 386 (e.g., back up, park view side, drone, etc.), and a battery charge monitoring sensor 388. However, it will be appreciated that sensor suite 360 may include any suitable sensor that enables trailer vehicle 304 to function as described herein.

As previously described, the MVCS 310 is configured to automatically perform various trailering maneuvers based on one or more signals from the trailer vehicle 304, lead vehicle 302, and/or tow bar system 200. Such signals, for example, are received from the trailer ADAS/autonomous driving system 358, the lead vehicle ADAS/autonomous driving system 316, and/or tow bar system 200. Accordingly, MVCS 310 may include one or more controllers, such as controllers 322, 370, to receive the one or more signals and execute one or more algorithms to provide the desired trailering maneuver. Moreover, the MVCS 310 integrates with the lead vehicle HMI system 400 to provide trailering information and control to the operator of the multi-vehicle system 300.

Figure 10:
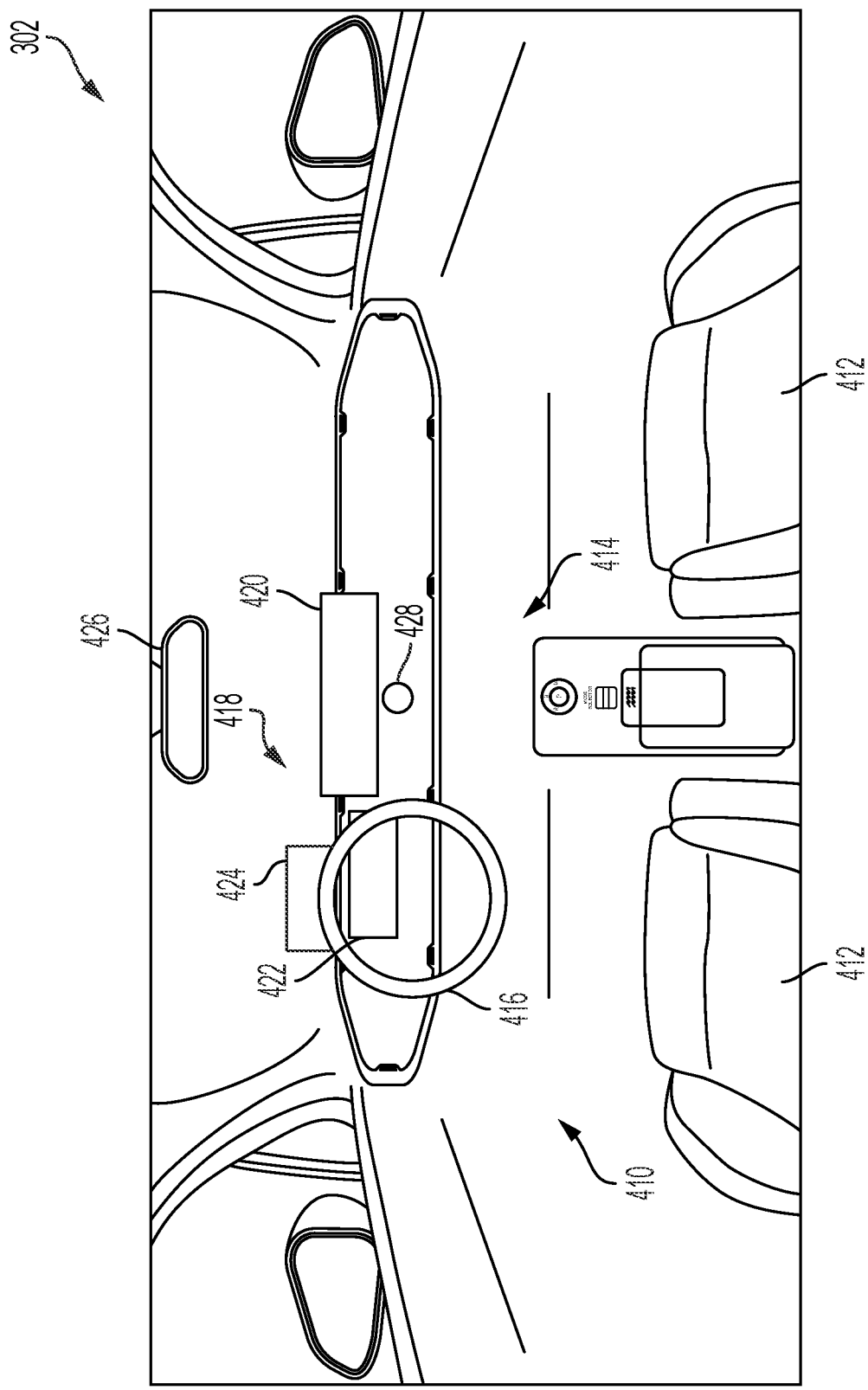
FIG. 10 is a partial view of an example lead vehicle of the MVCS including a plurality of displays of a human machine interface (HMI) system, in accordance with the principles of the present application.
Figure 11:
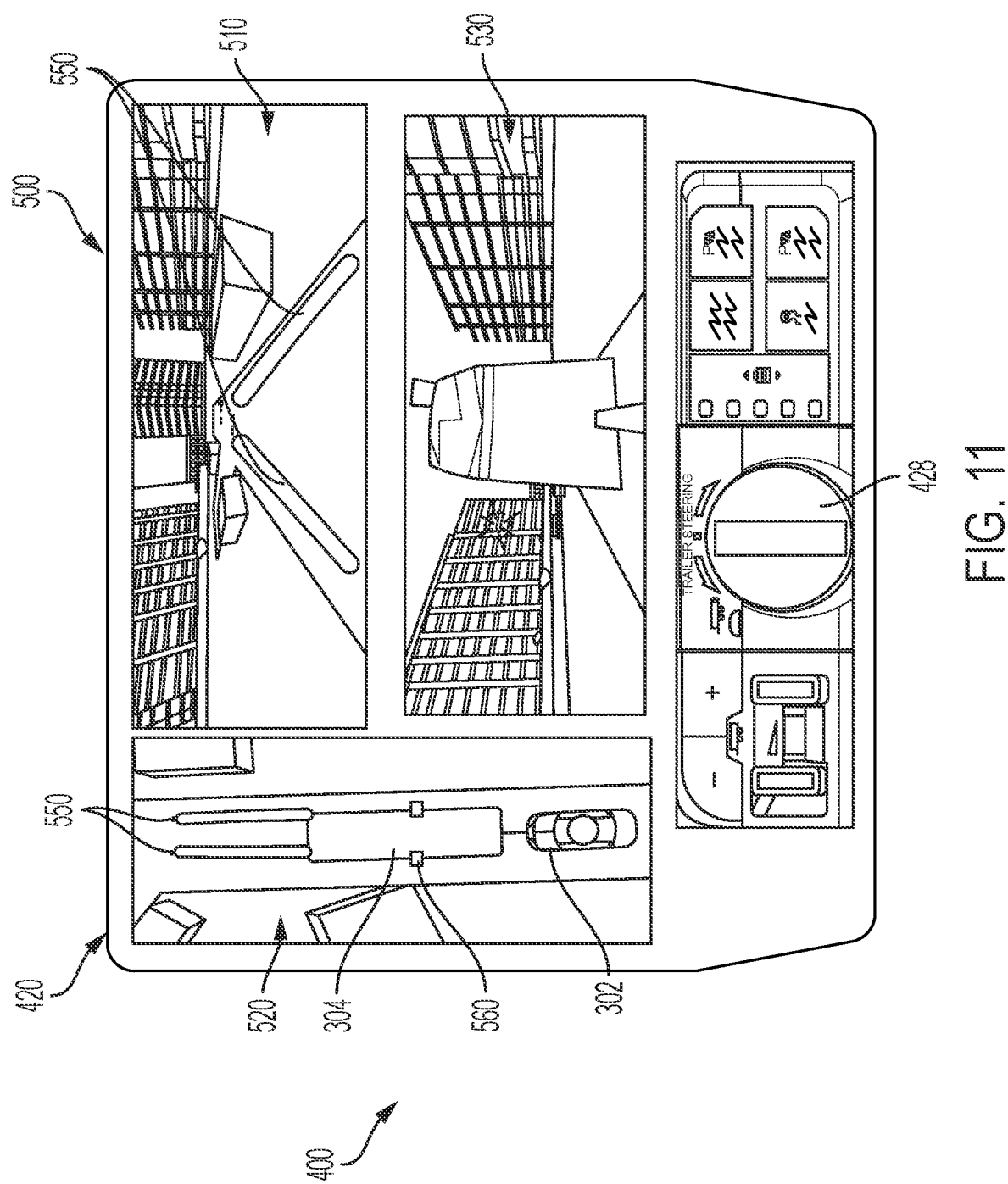
FIG. 11 is an example trailer reverse screen generated by the HMI system, in accordance with the principles of the present application.
Figure 12:
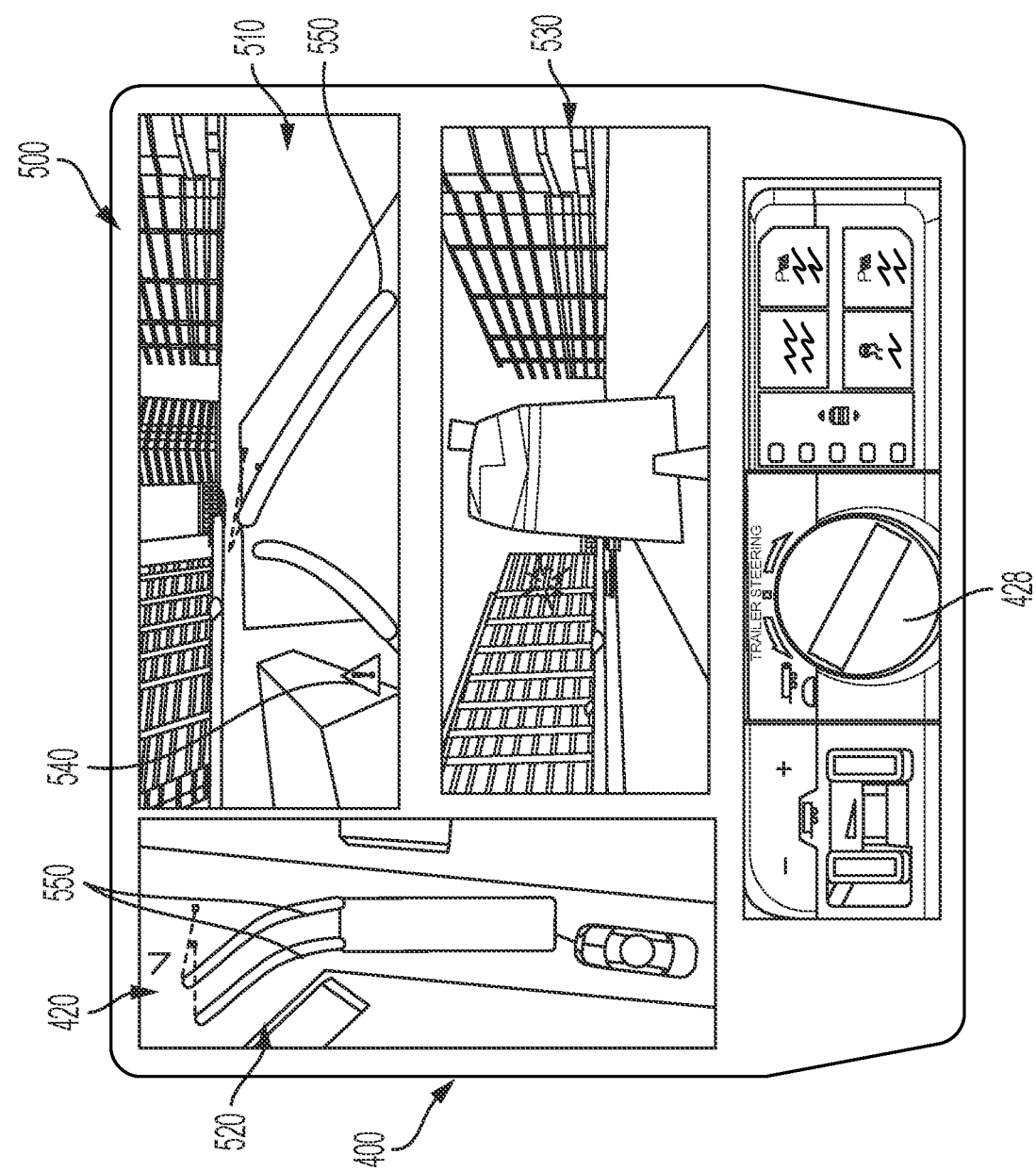
FIG. 12 is another example trailer reverse screen generated by the HMI system, in accordance with the principles of the present application.

With reference now to FIGS. 10-12, the HMI system 400 will be described in more detail. In the example embodiment, the HMI system 400 is a driver/user interface for a lead vehicle towing a motorized and steerable trailer that is attached to the lead vehicle by a tether. The HMI system 400 provides various layouts, organization, and priority of any trailering information provided to the lead vehicle driver during operation of the multi-vehicle system 300. The trailering information may be displayed in the lead vehicle's instrument cluster, center-stack display, heads-up-display (HUD), or any other display visible to the lead vehicle driver. Information may also be provided to the driver via visual, audio, or tactile feedback, which may be provided through one or more of the vehicle primary controls, such as steering wheel torque, brake and throttle control feedback tuning. Additionally, the HMI system 400 organizes and presents available inputs or selections for the driver via display selections, buttons, or the like.

In a Trailer Reverse mode, the HMI system 400 provides a drone view of the multi-vehicle system 300 and potential surrounding static and moving objects, an overlay of ultrasonic sensor detection around the vehicles, an overlay of mid-range radar sensor detection (e.g., cross-path), and a simultaneous large view for trailer reverse steering control (TRSC) driving.

In one example, the HMI system 400 will set different warnings (visual/audio/haptic) with appropriate escalations and interventions. Information displayed and inputs allowed may be selected automatically by the vehicle controller based on the driving environment (e.g., traffic, location, weather, road surface, etc.) or driver presets. Some actions may be taken automatically to protect the vehicle(s) and may selectively prevent overriding by the lead vehicle driver.

Accordingly, the HMI system 400 is configured to display information different from traditional trailer towing displays due to the different degree of freedom for a motorized and steerable trailer vehicle 304. The self-propelled trailer vehicle 304 is configured to behave differently as the driving environment changes, and the maneuvers required in such situations will cause the information provided to change in priority.

With particular reference now to FIG. 10, the HMI system 400 is integrated into the lead vehicle 302, which generally includes an interior cabin 410 having a plurality of seats 412, a center stack or instrument panel 414, and a steering wheel 416. The HMI system 400 is in signal communication with one or more displays 418 including, for example, a head unit or center display 420, a cluster display 422, a Heads-Up Display (HUD) 424, and a digital rear view mirror 426. For some of the reverse trailer maneuvers described herein, the HMI system is also in signal communication with a trailer reverse steering dial or knob 428. As described herein in more detail, the trailer reverse steering knob 428 allows the driver to turn the knob 428 in the direction they want the trailer to turn and the lead and/or trailer vehicle's steering system automatically makes the necessary adjustments to direct the trailer in the desired direction. However, it will be appreciated that HMI system 400 may be in signal communication with any suitable display, button, switch, electronic device, etc. that enables HMI system 400 to function as described herein.

As previously described, the HMI system 400 is configured to assist the driver when performing reversing maneuvers with the multi-vehicle system 300 and provide a comprehensive picture of the surroundings of the trailer vehicle 304 to eliminate the need for a spotter. The HMI system 400 and reverse maneuvering are described in more detail in FIGS. 11 and 12.

In the example embodiment, during the Trailer Reverse mode, the HMI system 400 is configured to display three distinct images to the lead vehicle driver. The first image is a featured viewpoint from the rear of the trailer vehicle 304, enabling the user to intuitively make control inputs to the trailer reverse steering knob 428 and drive the MVS 300 as if seated on the rear of the trailer vehicle 304. Dynamically adjusting path lines are shown on the first image, creating alignment between the direction of travel shown on the display, the direction the steering knob is turned, and the left-right orientation of the driver (via a mirrored image of the trailer rear camera). This camera perspective is wide enough for the driver to spot cross traffic where they would otherwise be unable to see from the cab of the lead vehicle. Corner radar for cross-traffic detection may also be integrated and alerts may be shown in this view.

The second image is a combined lead and trailer drone (overhead) view. This viewpoint combines data from several cameras and shows the lead vehicle and trailer vehicle moving together from a perspective above the two vehicles. The driver may select whether they want this perspective to show the trailer vehicle or lead vehicle at the top of the screen based on what is most intuitive. Obstacles that are near either vehicle may be detected using ultrasonic obstacle detection systems. Certain areas may be selected and zoomed to provide the driver with a rectilinear perspective to determine whether there is a threat of collision. Other camera views active may be indicated with icons in this view. The third image is a lead vehicle backup camera view. The viewpoints of individual cameras may be selected and displayed in this area once the lead vehicle rear camera has been shown.

Referring now to FIGS. 11-12, an example display and operation of the Trailer Reverse mode is illustrated. In the example embodiment, HMI system 400 displays a trailer reverse user interface screen 500 on the lead vehicle center display 420 once the trailer vehicle 304 is connected to the lead vehicle 302 and the user selects a trailer reverse maneuver (e.g., via menu button, putting the lead vehicle 302 in reverse gear, etc.). The Trailer Reverse screen 500 may also be reached from a previous screen/page (not shown) that includes a plurality of menu buttons, which when selected, provide information related to that particular menu button. For example, a trailer menu button (not shown) may become active once the trailer vehicle 304 is connected and, when selected, may allow the user to navigate to the Trailer Reverse screen 500.

In the illustrated example, the Trailer Reverse screen 500 is configured to provide and display the three images previously discussed. Accordingly, as shown, the Trailer Reverse screen 500 provides a trailer rear view 510, a multi-vehicle system top view 520, and a lead vehicle backup camera view 530. The trailer rear view 510 provides a view from one or more cameras disposed on a rear of the trailer vehicle 304. In one example, the trailer rear view 510 is a fisheye view (at least on the left/right edges) generated from a plurality of trailer rear cameras, which enables the driver a wide viewing periphery (e.g., 180° or more) to visually detect, for example, cross-traffic or other obstacles.

Such traffic or obstacles may also be detected by ultrasonic sensors (e.g., 382, 384) and warnings may be issued via the Trailer Reverse screen 500 and/or other method (e.g., audio or haptic). For example, HMI system 400 is configured to display warning icons 540 (e.g., FIG. 12) on the trailer rear view 510 when left/right cross-path sensors detect an object. For example, when an incoming parallel traffic is detected, a warning icon 540 is displayed on the trailer rear view 510 in the corresponding incoming direction. MVCS 310 and/or HMI system 400 may also issue an acoustic warning as well as illuminate one or more warning lights on external side view mirrors.

Additionally, dynamic steering lines 550 are generated and overlayed in the trailer rear view 510 to show a path of the trailer vehicle 304 based on the orientation of the trailer vehicle wheels. In one example embodiment, the dynamic steering lines 550 show both front and rear wheel trajectories to provide a clear visualization of the overall space occupied by the trailer vehicle 304 during the reversing maneuver. In this way, the driver may utilize the trailer steering knob 428, which is in signal communication with the MVCS 310, to control a steering direction of the lead vehicle 302 and/or the trailer vehicle 304.

The multi-vehicle system top view 520 utilizes the cameras and sensors of the MVS 300 to provide a drone (plan) view of the multi-vehicle system 300 and potential surrounding static and moving objects. The driver may manipulate the screen to adjust the orientation of the MVS 300 to show either the lead vehicle 302 or the trailer vehicle 304 at the top of the view. The driver may also manipulate the screen to zoom in on various areas of the view to assess potential obstacles and collision therewith.

The lead vehicle backup camera view 530 utilizes the lead vehicle backup camera to provide a rear view of the lead vehicle 302. Once the lead vehicle rear camera view is displayed, the driver may select various other camera views of the MVS 300 to be displayed in this area to enable the driver to view the surrounding environment from within the lead vehicle 302, particularly when the trailer vehicle 304 is large. For example, the HMI system 400 may generate and overlay a plurality of camera icons 560 on the multi-vehicle system top view 520 corresponding to locations and orientations of cameras of the lead vehicle sensor suite and the trailer vehicle sensor suite. When a user selects one of the camera icons, the HMI system 400 subsequently displays a view from that camera on the lead vehicle backup camera view 530 instead of a view from the backup camera.

Accordingly, the MVCS 310 and HMI system 400 provide a driver of the lead vehicle with an intuitive perspective for reversing their trailer without aid from another person outside of the lead vehicle. The systems utilize multiple camera input signals from the lead and trailer vehicles and provide them into one screen with three distinct views for improved visualization and operation during reverse trailer maneuvering without the need for assistance.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A human machine interface (HMI) system for a multi-vehicle system having a lead vehicle and a trailer vehicle with independent propulsion and control, the HMI system comprising:
 a display disposed in the lead vehicle;
 a lead vehicle sensor suite;
 a trailer vehicle sensor suite; and
 a controller in signal communication with the display, the lead vehicle sensor suite, and the trailer vehicle sensor suite, the controller configured to:
  generate a trailer reverse screen on the display when the trailer vehicle is connected to the lead vehicle and operated in a trailer reverse mode,
  wherein the trailer reverse screen includes (i) a trailer rear view showing a view from one or more cameras located on a rear of the trailer vehicle, (ii) a multi-vehicle system top view showing a view from above the multi-vehicle system based on signals from one or more cameras located on the multi-vehicle system, and (iii) a lead vehicle backup camera view from a lead vehicle backup camera, to thereby provide a driver of the lead vehicle with an intuitive perspective for reversing the trailer vehicle without aid from another person outside of the lead vehicle,
  wherein on the multi-vehicle system top view, the controller is configured to overlay a plurality of camera icons corresponding to locations and orientations of cameras of the lead vehicle sensor suite and the trailer vehicle sensor suite,
  wherein user selection of one of the camera icons displays a view from that camera on the lead vehicle backup camera view.

2. The HMI system of claim 1, wherein the trailer rear view is a mirrored image of the view from the one or more cameras located on the rear of the trailer vehicle to give the user the perception of being seated on the rear of the trailer vehicle and facing rearward.

3. The HMI system of claim 1, wherein the trailer rear view provides a view greater than or equal to a 180° viewing angle from a rear of the trailer vehicle to enable visual detection of cross-path objects that cannot be seen from within a cab of the lead vehicle.

4. The HMI system of claim 1, further comprising a trailer reverse steering control knob in signal communication with the controller and configured to control a steering system of the lead and/or trailer vehicle based on driver input into the steering control knob.

5. The HMI system of claim 4, wherein a right-turn input into the steering control knob initiates a right turn of the trailer vehicle as viewed from a location on the rear of the trailer vehicle and facing rearward thereof; and
 wherein a left-turn input into the steering control knob initiates a left turn of the trailer vehicle as viewed from the location on the rear of the trailer vehicle and facing rearward thereof.

6. The HMI system of claim 1, wherein the trailer rear view is configured to display one or more warning icons when an object is detected by an ADAS system of the trailer vehicle sensor suite.

7. The HMI system of claim 6, wherein the controller is configured to issue an acoustic warning when the object is detected.

8. The HMI system of claim 1, wherein the controller is configured to generate and overlay dynamic steering lines on the trailer rear view to show, via the display, a path of the trailer vehicle based on an orientation of wheels of the trailer vehicle.

9. The HMI system of claim 1, wherein the controller is configured to display the trailer reverse screen when a reverse gear of the lead vehicle is engaged.

10. The HMI system of claim 1, wherein the multi-vehicle system top view shows static and moving objects surrounding the multi-vehicle system to provide a comprehensive picture of the surroundings of the multi-vehicle system to further eliminate the need for aid from another person outside of the lead vehicle.

11. The HMI system of claim 1, wherein the controller is in signal communication with a tow bar system connecting the lead vehicle and the trailer vehicle.

12. The HMI system of claim 11, wherein the tow bar system includes:

at least one angle sensor configured to sense a first angle between the lead vehicle and the tow bar system, and a second angle between the trailer system and the tow bar system, wherein the controller is in signal communication with the at least one angle sensor.

13. The HMI system of claim 12, wherein the tow bar system further includes:

an extension sensor configured to measure a level of extension of the tow bar system; and a load cell configured to sense forces on the tow bar system, wherein the controller is in signal communication with the extension sensor and the load cell.

14. A human machine interface (HMI) system for a multi-vehicle system having a lead vehicle and a trailer vehicle with independent propulsion and control, the HMI system comprising:

a display disposed in the lead vehicle;

a lead vehicle sensor suite;

a trailer vehicle sensor suite; and a controller in signal communication with the display, the lead vehicle sensor suite, and the trailer vehicle sensor suite, the controller configured to:

generate a trailer reverse screen on the display when the trailer vehicle is connected to the lead vehicle and operated in a trailer reverse mode, wherein the trailer reverse screen includes (i) a trailer rear view showing a view from one or more cameras located on a rear of the trailer vehicle, (ii) a multi-vehicle system top view showing a view from above the multi-vehicle system based on signals from one or more cameras located on the multi-vehicle system, and (iii) a lead vehicle backup camera view from a lead vehicle backup camera, to thereby provide a driver of the lead vehicle with an intuitive perspective for reversing the trailer vehicle without aid from another person outside of the lead vehicle, wherein the controller is configured to generate and overlay dynamic steering lines on the trailer rear view to show, via the display, a path of the trailer vehicle based on an orientation of wheels of the trailer vehicle, wherein the dynamic steering lines show both a front trailer wheel trajectory and a rear trailer wheel trajectory to provide a clear visualization of an overall space occupied by the trailer vehicle during a reversing maneuver.

15. The HMI system of claim 14, further comprising a trailer reverse steering control knob in signal communication with the controller and configured to control a steering system of the lead and/or trailer vehicle based on driver input into the steering control knob.

16. The HMI system of claim 14, wherein the trailer rear view is configured to display one or more warning icons when an object is detected by an ADAS system of the trailer vehicle sensor suite.

17. The HMI system of claim 14, wherein the controller is configured to display the trailer reverse screen when a reverse gear of the lead vehicle is engaged.

18. A human machine interface (HMI) system for a multi-vehicle system having a lead vehicle and a trailer vehicle with independent propulsion and control, the HMI system comprising:

a display disposed in the lead vehicle;

a lead vehicle sensor suite;

a trailer vehicle sensor suite; and a controller in signal communication with the display, the lead vehicle sensor suite, and the trailer vehicle sensor suite, the controller configured to:

generate a trailer reverse screen on the display when the trailer vehicle is connected to the lead vehicle and operated in a trailer reverse mode, wherein the trailer reverse screen includes (i) a trailer rear view showing a view from one or more cameras located on a rear of the trailer vehicle, (ii) a multi-vehicle system top view showing a view from above the multi-vehicle system based on signals from one or more cameras located on the multi-vehicle system, and (iii) a lead vehicle backup camera view from a lead vehicle backup camera, to thereby provide a driver of the lead vehicle with an intuitive perspective for reversing the trailer vehicle without aid from another person outside of the lead vehicle, wherein the multi-vehicle system top view shows static and moving objects surrounding the multi-vehicle system to provide a comprehensive picture of the surroundings of the multi-vehicle system to further eliminate the need for aid from another person outside of the lead vehicle, wherein a user may zoom-in to various areas of the multi-vehicle system top view to assess potential obstacles.

19. The HMI system of claim 18, wherein the trailer rear view is configured to display one or more warning icons when an object is detected by an ADAS system of the trailer vehicle sensor suite.

20. The HMI system of claim 18, wherein the controller is configured to display the trailer reverse screen when a reverse gear of the lead vehicle is engaged.

* * * * *